US009200562B2

(12) United States Patent
Takahashi et al.

(10) Patent No.: US 9,200,562 B2
(45) Date of Patent: Dec. 1, 2015

(54) CONTROL DEVICE FOR INTERNAL COMBUSTION ENGINE WITH TURBO SUPERCHARGER

(75) Inventors: Kiyonori Takahashi, Susono (JP); Shinichi Soejima, Gotenba (JP); Satoru Tanaka, Susono (JP); Satoshi Yoshizaki, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/239,681

(22) PCT Filed: Aug. 23, 2011

(86) PCT No.: PCT/JP2011/068966
§ 371 (c)(1),
(2), (4) Date: Feb. 19, 2014

(87) PCT Pub. No.: WO2013/027267
PCT Pub. Date: Feb. 28, 2013

(65) Prior Publication Data
US 2014/0202137 A1 Jul. 24, 2014

(51) Int. Cl.
*F02D 23/00* (2006.01)
*F02B 43/02* (2006.01)
(Continued)

(52) U.S. Cl.
CPC ............... *F02B 43/02* (2013.01); *F02B 37/18* (2013.01); *F02D 41/0007* (2013.01); *F02D 41/024* (2013.01); *Y02T 10/144* (2013.01); *Y02T 10/26* (2013.01)

(58) Field of Classification Search
CPC ........ F02B 37/18; F02B 37/16; F02B 37/007; F02B 37/24; F02D 41/0007

USPC ................. 60/284, 285, 286, 600, 602, 605.1
See application file for complete search history.

(56) References Cited

U.S. PATENT DOCUMENTS 4,235,076 A * 11/1980 Meloche et al. ................ 60/602
4,244,187 A * 1/1981 Lane et al. ...................... 60/602
(Continued)

FOREIGN PATENT DOCUMENTS

JP     2003-254051     9/2003
JP     2006 152821     6/2006
(Continued)

OTHER PUBLICATIONS

Machine Translation of JP 2006-152821, Translated on Nov. 17, 2014.*
(Continued)

*Primary Examiner* — Thomas Denion
*Assistant Examiner* — Patrick Maines
(74) *Attorney, Agent, or Firm* — Oblon, McClelland, Maier & Neustadt, L.L.P.

(57) ABSTRACT

An object of the present invention is to control a supercharge pressure in such a manner as not to interfere with warming-up of an exhaust gas purifying catalyst, in an internal combustion engine with a turbo supercharger. To this end, a control device for an internal combustion engine with a turbo supercharger provided by the present invention makes a determined value of a target supercharge pressure with respect to a same target intake pressure smaller when a request to warm up the exhaust gas purifying catalyst is present, as compared with when the request is absent. Note that the target intake pressure is determined based on a target air amount determined from a requested torque for the internal combustion engine. The present control device operates a throttle based on the target intake pressure and an actual supercharge pressure, and operates a wastegate valve based on the target supercharge pressure.

2 Claims, 3 Drawing Sheets

(51) Int. Cl.
 *F02D 41/00* (2006.01)
 *F02D 41/02* (2006.01)
 *F02B 37/18* (2006.01)

(56) References Cited

U.S. PATENT DOCUMENTS

| | | |
|---|---|---|
| 2003/0074899 A1* | 4/2003 | Yamaguchi et al. ............ 60/612 |
| 2006/0196182 A1 | 9/2006 | Kimoto et al. |
| 2008/0022678 A1* | 1/2008 | Irisawa et al. ................... 60/600 |
| 2009/0292446 A1 | 11/2009 | Tanaka |
| 2011/0023480 A1* | 2/2011 | Chyo ............................... 60/602 |
| 2014/0224227 A1* | 8/2014 | Yoshizaki et al. ......... 123/559.1 |
| 2014/0325983 A1* | 11/2014 | Tsunooka ....................... 60/602 |

FOREIGN PATENT DOCUMENTS

| | | |
|---|---|---|
| JP | 2006152821 A * | 6/2006 |
| JP | 2006 242063 | 9/2006 |
| JP | 2007 92622 | 4/2007 |
| JP | 2007 315217 | 12/2007 |
| JP | 2007315217 A * | 12/2007 |
| JP | 2008 151051 | 7/2008 |
| JP | 2008 255896 | 10/2008 |

OTHER PUBLICATIONS

Machine Translation of JP 2007-315217, Translated on Nov. 17, 2014.*
International Search Report Issued Nov. 29, 2011 in PCT/JP11/068966 Filed Aug. 23, 2011.

* cited by examiner

US 9,200,562 B2

CONTROL DEVICE FOR INTERNAL COMBUSTION ENGINE WITH TURBO SUPERCHARGER

TECHNICAL FIELD

The present invention relates to a control device for an internal combustion engine with a turbo supercharger, and particularly relates to a control device for an internal combustion engine with a turbo supercharger capable of actively controlling a rotational frequency of a turbine by operation of an actuator.

BACKGROUND ART

As one of the methods for controlling internal combustion engines for automobiles, there is known torque demand control that determines a manipulated variable of an actuator with a torque as a controlled variable. Torque demand control also can be applied to internal combustion engines with turbo superchargers. In the torque demand control of an internal combustion engine with a turbo supercharger, a manipulated variable of a throttle is determined based on a requested torque, and a manipulated variable of an actuator for supercharge pressure control is determined based on the requested torque. A supercharge pressure controlling actuator is an actuator that can actively control a rotational frequency of a turbine, and a wastegate valve and a variable nozzle can be cited as examples. In more detail, the operation of the supercharge pressure controlling actuators is performed in accordance with a target supercharge pressure determined based on the requested torque. As a method for determining the target supercharge pressure from the requested torque, there is known a method that determines a target air amount from a requested torque, and further calculates a target supercharge pressure from the target air amount, as disclosed in Japanese Patent Laid-Open No. 2007-315217. Further, there is also known a method that determines a target intake pressure from a target air amount, and calculates a target supercharge pressure from the target intake pressure, as disclosed in Japanese Patent Laid-Open No. 2006-152821.

In the torque demand control for an internal combustion engine with a turbo supercharger, a target supercharge pressure is determined with emphasis placed on operation performance, in more detail, response of a torque generated by the internal combustion engine to an accelerator operation. However, the performance required of an internal combustion engine is not only the operation performance like this. Exhaust gas performance, namely, reducing harmful components contained in an exhaust gas is also one of the performance required of an internal combustion engine. Besides obtaining sufficient exhaust gas performance, activating an exhaust gas purifying catalyst early is one requirement, and for this purpose, warming-up of the exhaust gas purifying catalyst has to be performed quickly. However, in the case of an internal combustion engine with a turbo supercharger, an exhaust gas temperature is sometimes reduced due to heat loss that occurs in the turbine. In order to increase a supercharge pressure, large turbine work is necessary, but as the turbine work is larger, the heat loss occurring in the turbine becomes larger. Therefore, depending on the method for controlling the supercharge pressure, there arises the fear of interfering warming-up of the exhaust gas purifying catalyst due to reduction in the exhaust gas temperature in the turbine.

CITATION LIST

Patent Literature

Patent Literature 1: Japanese Patent Laid-Open No. 2007-315217
Patent Literature 2: Japanese Patent Laid-Open No. 2008-151051
Patent Literature 3: Japanese Patent Laid-Open No. 2008-255896
Patent Literature 4: Japanese Patent Laid-Open No. 2006-152821

SUMMARY OF INVENTION

The present invention has an object to control a supercharge pressure so as not to interfere warming-up of an exhaust gas purifying catalyst, in an internal combustion engine with a turbo supercharger. In order to attain the object, a control device for an internal combustion engine with a turbo supercharger according to the present invention is configured as follows.

According to one mode of the present invention, the present control device acquires a requested torque for an internal combustion engine. Subsequently, the control device determines a target air amount from the requested torque, determines a target intake pressure from the target air amount, and further determines a target supercharge pressure from the target intake pressure. Subsequently, the control device operates a throttle based on the target intake pressure and an actual supercharge pressure, and operates a supercharge pressure controlling actuator in accordance with the target supercharge pressure. The supercharge pressure controlling actuator is an actuator that is capable of actively controlling a rotational frequency of a turbine, and typical examples thereof are a wastegate valve, and a variable nozzle. When determining the target supercharge pressure from the target intake pressure, the present control device makes a determined value of the target supercharge pressure with respect to a same target intake pressure smaller in a case of presence of a request to warm up an exhaust gas purifying catalyst, as compared with a case of absence of such a request. As a more specific method for determining the target supercharge pressure, a method may be adopted, that includes, in advance, a map that gives a target supercharge pressure of a relatively large value with respect to a same target intake pressure, and a map that gives a target supercharge pressure of a relatively small value with respect to the same target intake pressure, and switches the map for use in determination of the target supercharge pressure in response to presence or absence of the request to warm up the exhaust gas purifying catalyst.

According to the control device configured as above, when the request to warm up the exhaust gas purifying catalyst is present, the supercharge pressure controlling actuator is operated so that a supercharge pressure becomes lower as compared with the case in which such a request is absent. As a result that turbine work is reduced by the operation, heat loss that occurs in the turbine is reduced, and decline of the exhaust gas temperature can be suppressed.

DESCRIPTION OF EMBODIMENT

An embodiment of the present invention will be described with reference to the drawings.

An internal combustion engine 1 with a turbo supercharger 3 (hereinafter, an engine) to be an object to be controlled in the present embodiment is a four-cycle reciprocal engine for an automobile that can control a torque by regulation of an air amount by a throttle. To a turbo supercharger provided in the engine, a wastegate valve (hereinafter, a WGV) capable of adjusting an opening is attached. A control device controls an operation of the engine by operating actuators included in the engine. The actuators that the control device can operate include an ignition device, a throttle, a fuel injection device, a variable valve timing mechanism, a WGV and the like. However, the control device operates the throttle and the WGV in the present embodiment. The control device operates these two actuators to control the torque outputted by the engine.

Figure 1:
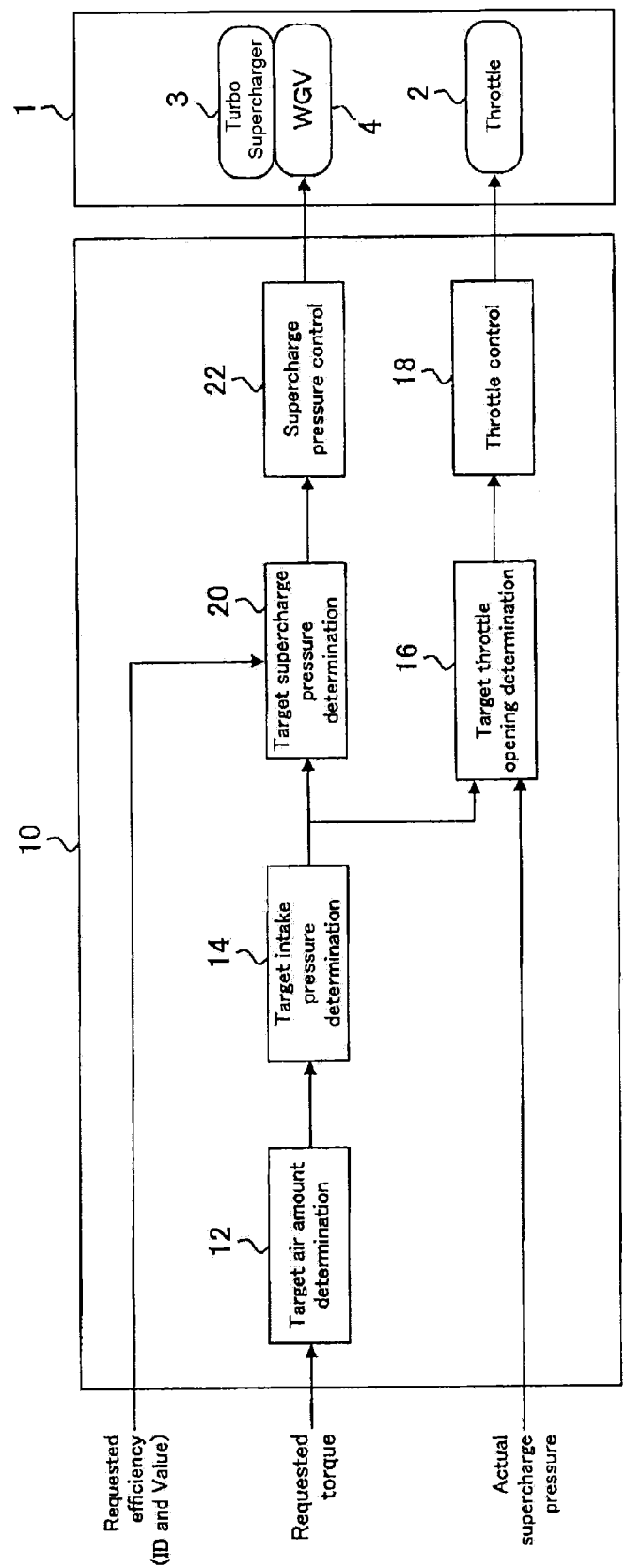
FIG. 1 is a block diagram showing a configuration of a control device according to an embodiment of the present invention.

A control device 10 shown in a block diagram of FIG. 1 shows a configuration of the control device of the present embodiment. Respective elements 12, 14, 16, 18, 20 and 22 that configure the control device 10 in FIG. 1 are the result of specially expressing, in the drawing, only elements concerning operations of a throttle 2 and a WGV 4, out of various functional elements that the control device 10 has. Accordingly, FIG. 1 does not mean that the control device 10 is configured by only these elements. Note that the respective elements may be each configured by dedicated hardware, or may share hardware and may be virtually configured by software. Hereinafter, the configuration of the control device 10 will be described with attention focused on functions of the respective elements 12, 14, 16, 18, 20 and 22 shown in FIG. 1.

The control device 10 is provided with a requested torque and a requested efficiency from a power train manager (not illustrated) that generally controls an entire vehicle. The requested torque is a requested value of an illustrated torque that is generated by the engine. The requested torque includes a requested torque from a driver that is calculated from a manipulated variable and an operation speed of an accelerator pedal, and a requested torque from control devices for a vehicle such as ECT (Electronic Controlled Transmission) and a TRC (Traction Control System). The requested efficiency is a parameter that is used for control of ignition timing. When an operation at optimum ignition timing is requested, the power train manager sets the value of the requested efficiency at 1 that is a maximum value. It is when ignition timing is requested to be retarded from the optimum ignition timing that the requested efficiency is set at a value smaller than 1. The cases that are applicable to the above are, for example, a case in which an exhaust gas temperature is desired to be raised for the purpose of warming-up of an exhaust gas purifying catalyst, and a case in which a torque is desired to be reduced abruptly. An ID for identifying a content of a request is attached to the requested efficiency that is supplied to the control device 10 from the power train manager.

The control device 10 determines a target air amount from the acquired requested torque. For determination of the target air amount, a target air amount determining part 12 is used. The target air amount determining part 12 converts the requested torque into an air amount by using a conversion map that is prepared in advance. The air amount mentioned here means an air amount that is taken into a cylinder. In the target air amount determining part 12, the air amount required to realize the requested torque is determined as the target air amount of the engine.

Next, the control device 10 determines a target intake pressure from the target air amount. For determination of the target intake pressure, a target intake pressure determining part 14 is used. The target intake pressure determining part 14 converts the target air amount into an intake pressure by using a conversion map prepared in advance. Alternatively, the target air amount may be converted into the intake pressure with use of a physical model. The intake pressure mentioned here means a pressure in a space from the throttle to the intake vale. In the target intake pressure determining part 14, the intake pressure required to realize the target air amount is determined as the target intake pressure of the engine.

The target intake pressure is inputted in a target throttle opening determining part 16. An actual supercharge pressure measured by a supercharge pressure sensor (not illustrated) is also inputted in the target throttle opening determining part 16. The target throttle opening determining part 16 calculates a throttle opening that is necessary to achieve a target intake pressure when an actual supercharge pressure is a precondition, as a target throttle opening. In the calculation, a throttle model that is obtained by modeling a relation that is established among the supercharge pressure, the throttle opening and the intake pressure is used. The target throttle opening is inputted in a throttle control part 18. The throttle control part 18 performs an operation of the throttle 2 in accordance with the target throttle opening.

Further, the control device 10 determines a target supercharge pressure from the target intake pressure in parallel with determining the target throttle opening from the target intake pressure. Determining the target supercharge pressure from the target intake pressure instead of the target air amount has the technical meaning that the determination is hardly affected by change in valve timing. For the determination of the target supercharge pressure, a target supercharge pressure determining part 20 is used. In the target supercharge pressure determining part 20, a value of the requested efficiency and ID thereof are inputted together with the target intake pressure. Hereinafter, a content of processing that is performed in the target supercharge pressure determining part 20 will be described with use of FIG. 2 and FIG. 3.

Figure 2:
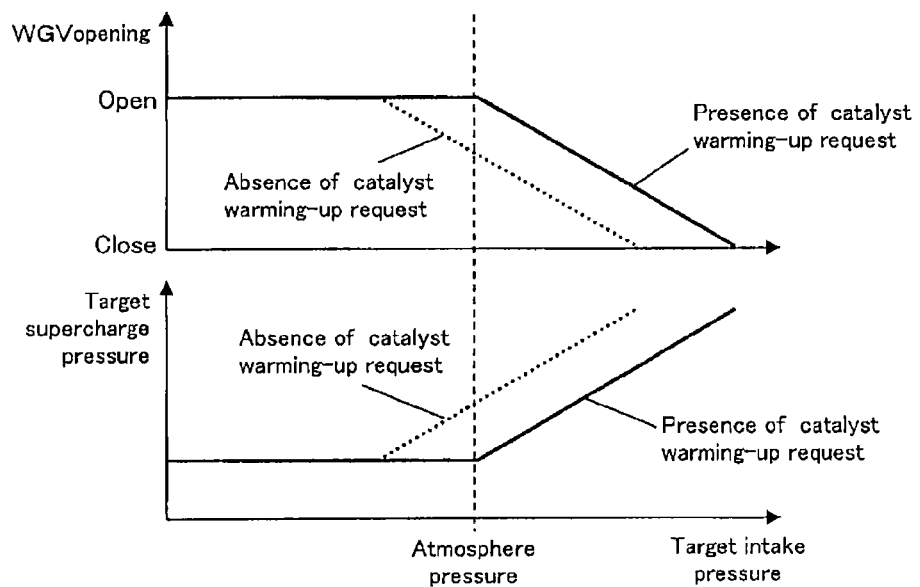
FIG. 2 is a chart for explaining processes to switch a setting of a target supercharge pressure in accordance with presence or absence of a request for warming-up of a catalyst.

A lower stage of FIG. 2 shows an image of a map that is used by the target supercharge pressure determining part 20 in determination of the target supercharge pressure. As the map that is used by the target supercharge pressure determining part 20, two kinds of maps are prepared, that are a first map showing a relation of the target intake pressure and the target supercharge pressure in a solid line in the drawing, and a second map showing the same relation by the dotted line. According to these maps, in a region where the target intake pressure is a predetermined value or less, the target supercharge pressure is made constant, and when the target intake pressure exceeds the aforementioned predetermined value, the target supercharge pressure is also increased in response to a magnitude of the target intake pressure. However, in the first map, a value of the target intake pressure at which the target supercharge pressure rises is set at atmospheric pressure, whereas in the second map, the value of the target intake pressure at which the target supercharge pressure rises is set at a value lower than atmospheric pressure. Therefore, with respect to the same target intake pressure, the target supercharge pressure of a relatively small value is given in the first map, and the target supercharge pressure of a relatively large value is given in the second map. The target supercharge pressure determining part 20 selects the map for use in determination of the target supercharge pressure in response to the content of the requested efficiency. If the requested efficiency is the one requesting warming-up of the exhaust gas purifying catalyst, the target supercharge pressure determining part 20 selects the first map, and if the requested efficiency is the one requesting a thing other than warming-up of the exhaust gas purifying catalyst, the target supercharge pressure determining part 20 selects the second map. In accordance with the selected map, setting of the target supercharge pressure with respect to the target intake pressure is switched.

An upper stage of FIG. 2 shows a relation of an opening of the WGV 4 and the target intake pressure that is realized by each of the maps. The broken line drawn in a solid line shows the relation of the opening of the WGV 4 and the target intake pressure in the case of the first map being selected. The broken line drawn in a dotted line shows the relation of the opening of the WGV 4 and the target intake pressure in the case of the second map being selected. As is obvious when these two are compared, when the first map is selected in a supercharging region, the WGV 4 is opened by a larger amount with respect to the same target intake pressure than when the second map is selected. As the opening of the WGV 4 is larger, an amount of flow of exhaust gas that flows into the turbine becomes smaller, and the turbine work is suppressed to be small. As a result, the heat loss that occurs in the turbine becomes small, and decline of the exhaust gas temperature by the turbine is suppressed. Namely, when the first map is selected, supercharge pressure control with emphasis placed on the exhaust gas temperature is performed, whereby warming-up of the exhaust gas purifying catalyst can be promoted while decline of the exhaust gas temperature is suppressed. Meanwhile, when the second map is selected, the supercharge pressure is set to be high with respect to the same target intake pressure, and therefore, response of the torque generated by the engine to an accelerator operation can be enhanced. Namely, supercharge pressure control with emphasis placed on response is enabled.

Figure 3:
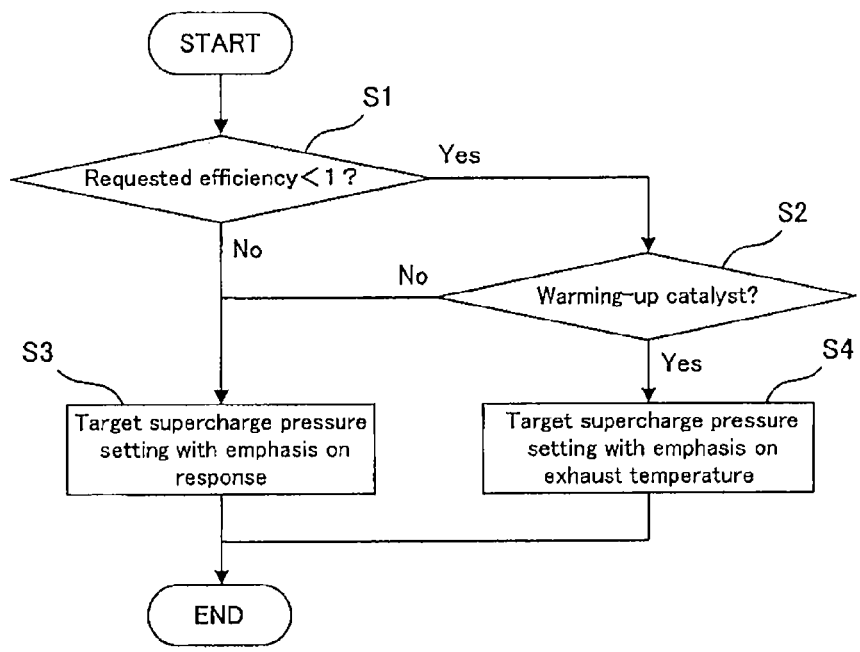
FIG. 3 is a flow chart showing procedures of switching the setting of the target supercharge pressure.

Switching of the setting of the target supercharge pressure by the target supercharge pressure determining part 20 is performed in accordance with a determination procedure shown in a flowchart of FIG. 3. First, in step S1, it is determined whether the value of the requested efficiency is smaller than 1. If the value of the requested efficiency is 1, processing of step S3 is selected. Namely, by the second map being selected, setting of the target supercharge pressure with emphasis placed on response is made. When the value of the requested efficiency is smaller than 1, determination of step S2 is performed. In step S2, it is determined whether the content of the request is warming-up of the exhaust gas purifying catalyst from the ID of the requested efficiency. If the content of the request is not warming-up of the exhaust gas purifying catalyst, the processing of step S3 is selected, and setting of the target supercharge pressure with emphasis placed on response is made. In contrast with this, if the content of the request is warming-up of the exhaust gas purifying catalyst, processing of step S4 is selected. Namely, by the first map being selected, setting of the target supercharge pressure with emphasis placed on the exhaust gas temperature is made. As is known from the flowchart, ordinary setting of the target supercharge pressure is the one with emphasis placed on response, and only when warming-up of the exhaust gas purifying catalyst is requested, setting is switched to the setting with emphasis placed on the exhaust gas temperature.

The target supercharge pressure determined in the target supercharge pressure determining part 20 is inputted in a supercharge pressure control part 22. In the supercharge pressure control part 22, the opening of the WGV 4 necessary to realize the target supercharge pressure is calculated as a target WGV opening. In calculation of the target WGV opening, various engine state quantities such as an engine speed and a load are used as parameters. The supercharge pressure control part 22 performs an operation of the WGV 4 in accordance with the calculated target WGV opening.

Figure 4:
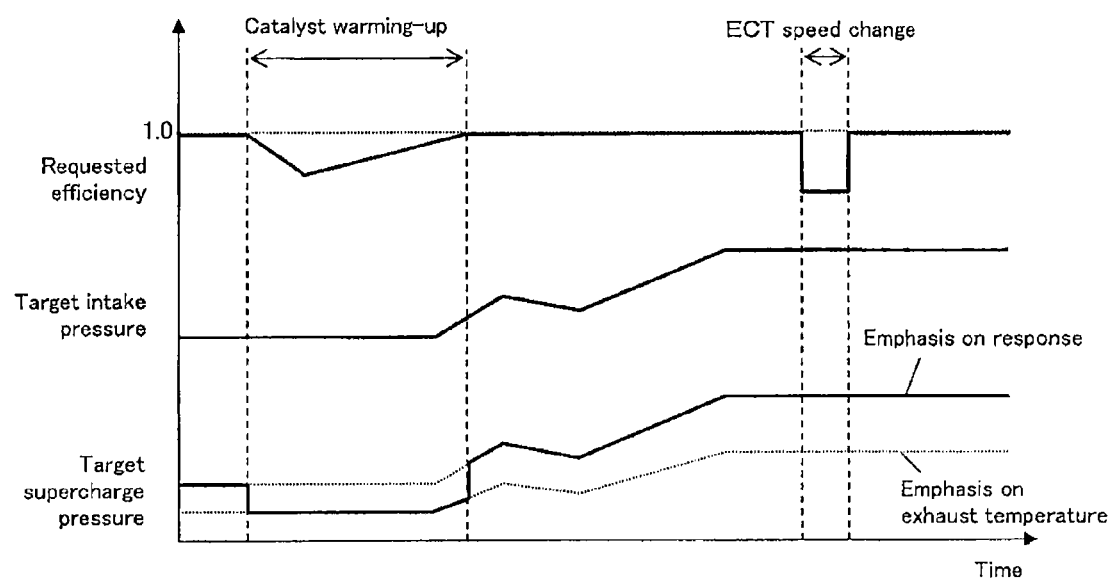
FIG. 4 is a chart showing a control result by the control device according to the embodiment of the present invention.

According to the control device 10 configured as above, a control result as shown in, for example, FIG. 4 can be obtained. FIG. 4 shows a change with respect to time of each of the requested efficiency, the target intake pressure and the target supercharge pressure by the control device 10. In an example shown in FIG. 4, the value of the requested efficiency is made smaller than 1 twice. The first requested efficiency that is smaller than 1 is a requested efficiency for warming-up of the exhaust gas purifying catalyst, and the second requested efficiency that is smaller than 1 is a requested efficiency for speed change of an ECT. Whether the requested efficiency is the one requesting warming-up of the exhaust gas purifying catalyst or the one requesting the ECT speed change is distinguished according to the ID that is attached to the requested efficiency.

When the request is for warming-up of the exhaust gas purifying catalyst, setting of the target supercharge pressure with emphasis placed on the exhaust gas temperature is made. Namely, while the requested efficiency is smaller than 1, the target supercharge pressure is made smaller than the value at an ordinary time (the value at the time of emphasis being placed on response). Thereby, the WGV 4 is opened, and exhaust gas at a high temperature that bypasses the turbine is directly supplied to the exhaust gas purifying catalyst. In contrast with this, when the request is for speed change of the ECT, setting of the target supercharge pressure with emphasis placed on response is made as in ordinary cases. Therefore, unlike the case of warming-up of the exhaust gas purifying catalyst, the target supercharge pressure is not reduced in accordance with reduction in the requested efficiency. This is for the purpose of preventing occurrence of supercharge retardation when the torque is raised in response to completion of ECT speed change.

Note that though explanation using the drawing is omitted, the control device 10 performs ignition timing control in parallel with the throttle control and the supercharge pressure control described above. In the ignition timing control, ignition timing is set as optimum ignition timing when the value of the requested efficiency is 1, and as the value of the requested efficiency is smaller than 1, the retardation amount with respect to the optimum ignition timing is made larger.

The above is explanation of the embodiment of the present invention. However, the present invention is not limited to the aforementioned embodiment, and can be carried out by being modified variously within the range without departing from the gist of the present invention. For example, in step S1 of the flowchart of FIG. 3, the threshold value is set as 1, and it is determined whether the value of the requested efficiency is smaller than 1, but the threshold value may be set at a value smaller than 1. Further, when the ID attached to the value of the requested efficiency indicates the request for warming-up of the catalyst, it can be determined that warming-up of the catalyst is requested more strongly as the value of the requested efficiency is smaller. Therefore, setting of the target supercharge pressure with respect to the target intake pressure may be made multi-stage, and setting may be switched so that as the value of the requested efficiency is smaller, the value of the target supercharge pressure with respect to the same target intake pressure becomes smaller.

Further, in the aforementioned embodiment, the map for use in setting of the target supercharge pressure is switched according to whether emphasis is placed on response or on the exhaust gas temperature, but the map for use in setting of the target supercharge pressure may be only the map with emphasis placed on response. When there is a request for warming-up of the exhaust gas purifying catalyst, the value of the target supercharge pressure obtained from the map may be corrected to a smaller value. More preferably, the value of the target supercharge pressure obtained from the map may be corrected in response to the value of the requested efficiency.

As the supercharge pressure controlling actuator, a variable nozzle of the turbine can be used, besides the WGV.

DESCRIPTION OF REFERENCE NUMERALS

2 Throttle
4 Wastegate valve
10 Control device
12 Target air amount determining part
14 Target intake pressure determining part
16 Target throttle opening determining part
18 Throttle control part
20 Target supercharge pressure determining part
22 Supercharge pressure control part

The invention claimed is:

1. A control device for an internal combustion engine with a turbo supercharger capable of actively controlling a rotational frequency of a turbine by an operation of an actuator, comprising:

a target air amount determining unit that acquires a requested torque for the internal combustion engine, and determines a target air amount from the requested torque;
a target intake pressure determining unit that determines a target intake pressure from the target air amount;
a target supercharge pressure determining unit that determines a target supercharge pressure from the target intake pressure;
a throttle control unit that operates a throttle based on the target intake pressure and an actual supercharge pressure; and
a supercharge pressure control unit that operates the actuator in accordance with the target supercharge pressure,
wherein when a request to warm up an exhaust gas purifying catalyst disposed in an exhaust passage of the internal combustion engine is present, the target supercharge pressure determining unit makes a determined value of a target supercharge pressure with respect to a same target intake pressure smaller as compared with when the request is absent.

2. The control device for an internal combustion engine with a turbo supercharger according to claim 1,
wherein the target supercharge pressure determining unit includes a first map that gives a target supercharge pressure of a first value with respect to a target intake pressure, and a second map that gives a target supercharge pressure of a second value that is smaller than the first value with respect to the same target intake pressure, and switches the first map and the second map for use in determination of the target supercharge pressure in response to a presence or an absence of the request.

* * * * *